(12) United States Patent
LeBegue et al.

(10) Patent No.: US 8,448,450 B2
(45) Date of Patent: May 28, 2013

(54) SUPPORT ASSEMBLY FOR TRANSITION DUCT IN TURBINE SYSTEM (75) Inventors: Jeffrey Scott LeBegue, Simpsonville, SC (US); Kevin Weston McMahan, Greer, SC (US); Ronnie Ray Pentecost, Travelers Rest, SC (US); James Scott Flanagan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 13/176,166

(22) Filed: Jul. 5, 2011

(65) Prior Publication Data

US 2013/0008177 A1 Jan. 10, 2013

(51) Int. Cl.
*F02C 7/20* (2006.01)

(52) U.S. Cl.
USPC .......................................................... 60/796

(58) Field of Classification Search
USPC .................. 60/796, 799, 800, 752, 39.37
See application file for complete search history.

(56) References Cited

U.S. PATENT DOCUMENTS

| | | |
|---|---|---|
| 4,422,288 A | 12/1983 | Steber |
| 5,077,967 A | 1/1992 | Widener et al. |
| 5,118,120 A | 6/1992 | Drerup et al. |
| 5,249,920 A | 10/1993 | Shepherd et al. |
| 5,414,999 A | 5/1995 | Barnes |
| 5,419,250 A | 5/1995 | Plemmons et al. |
| 5,457,954 A | 10/1995 | Boyd et al. |
| 5,592,820 A | 1/1997 | Alary et al. |
| 5,761,898 A | 6/1998 | Barnes et al. |
| 5,839,283 A | 11/1998 | Dübbeling |
| 5,934,687 A | 8/1999 | Bagepalli et al. |
| 6,202,420 B1 | 3/2001 | Zarzalis et al. |
| 6,203,025 B1 | 3/2001 | Hayton |
| 6,442,946 B1 | 9/2002 | Kraft et al. |
| 6,471,475 B1 | 10/2002 | Sasu et al. |
| 6,537,023 B1 | 3/2003 | Aksit et al. |
| 6,564,555 B2 | 5/2003 | Rice et al. |
| 6,652,229 B2 | 11/2003 | Lu |
| 6,662,567 B1 | 12/2003 | Jorgensen |
| 7,007,480 B2 | 3/2006 | Nguyen et al. |
| 7,024,863 B2 | 4/2006 | Morenko |
| 7,181,914 B2 | 2/2007 | Pidcock et al. |

(Continued)

FOREIGN PATENT DOCUMENTS

WO 2010030309 A2 3/2010

OTHER PUBLICATIONS

EP Search Report and Written Opinion from Application No. 12174844.6 dated Sep. 17, 2012.
Co-Pending U.S. Appl. No. 13/152,613, filed Jun. 3, 2011.

(Continued)

*Primary Examiner* — Phutthiwat Wongwian
*Assistant Examiner* — Vikansha Dwivedi
(74) *Attorney, Agent, or Firm* — Dority & Manning P.A.

(57) ABSTRACT

A support assembly for a turbine system is disclosed. The support assembly includes a transition duct extending between a fuel nozzle and a turbine section. The transition duct has an inlet, an outlet, and a passage extending between the inlet and the outlet and defining a longitudinal axis, a radial axis, and a tangential axis. The outlet of the transition duct is offset from the inlet along the longitudinal axis. The support assembly further includes a plurality of protrusions extending from the transition duct. The plurality of protrusions are configured to allow movement of the transition duct about at least one axis.

18 Claims, 5 Drawing Sheets

U.S. PATENT DOCUMENTS

| | | |
|---|---|---|
| 7,584,620 B2 | 9/2009 | Weaver et al. |
| 7,637,110 B2 | 12/2009 | Czachor et al. |
| 7,721,547 B2 | 5/2010 | Bancalari et al. |
| 7,762,075 B2 * | 7/2010 | Pangle et al. .................. 60/752 |
| 8,322,146 B2 | 12/2012 | Rizkalla et al. |
| 2010/0037617 A1 | 2/2010 | Charron et al. |
| 2010/0037618 A1 | 2/2010 | Charron et al. |
| 2010/0037619 A1 | 2/2010 | Charron |
| 2010/0115953 A1 | 5/2010 | Davis, Jr. et al. |
| 2010/0180605 A1 | 7/2010 | Charron |
| 2011/0259015 A1 | 10/2011 | Johns et al. |

OTHER PUBLICATIONS

Co-Pending U.S. Appl. No. 13/152,638, filed Jun. 3, 2011.

* cited by examiner

SUPPORT ASSEMBLY FOR TRANSITION DUCT IN TURBINE SYSTEM

FIELD OF THE INVENTION

The subject matter disclosed herein relates generally to turbine systems, and more particularly to support assemblies for transition ducts in turbine systems.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The compressor sections of turbine systems generally include tubes or ducts for flowing the combusted hot gas therethrough to the turbine section or sections. Recently, compressor sections have been introduced which include tubes or ducts that shift the flow of the hot gas. For example, ducts for compressor sections have been introduced that, while flowing the hot gas longitudinally therethrough, additionally shift the flow radially or tangentially such that the flow has various angular components. These designs have various advantages, including eliminating first stage nozzles from the turbine sections. The first stage nozzles were previously provided to shift the hot gas flow, and may not be required due to the design of these ducts. The elimination of first stage nozzles may eliminate associated pressure drops and increase the efficiency and power output of the turbine system.

However, the connection of these ducts to turbine sections is of increased concern. For example, because the ducts do not simply extend along a longitudinal axis, but are rather shifted off-axis from the inlet of the duct to the outlet of the duct, thermal expansion of the ducts can cause undesirable shifts in the ducts along or about various axes. These shifts can cause stresses and strains within the ducts, and may cause the ducts to fail.

Thus, an improved support assembly for supporting a transition duct in a turbine system would be desired in the art. For example, a support assembly that allows for thermal growth of the duct would be advantageous.

BRIEF DESCRIPTION OF THE INVENTION

Aspects and advantages of the invention will be set forth in part in the following description, or may be obvious from the description, or may be learned through practice of the invention.

In one embodiment, a support assembly for a turbine system is disclosed. The support assembly includes a transition duct extending between a fuel nozzle and a turbine section. The transition duct has an inlet, an outlet, and a passage extending between the inlet and the outlet and defining a longitudinal axis, a radial axis, and a tangential axis. The outlet of the transition duct is offset from the inlet along the longitudinal axis. The support assembly further includes a plurality of protrusions extending from the transition duct. The plurality of protrusions are configured to allow movement of the transition duct about at least one axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
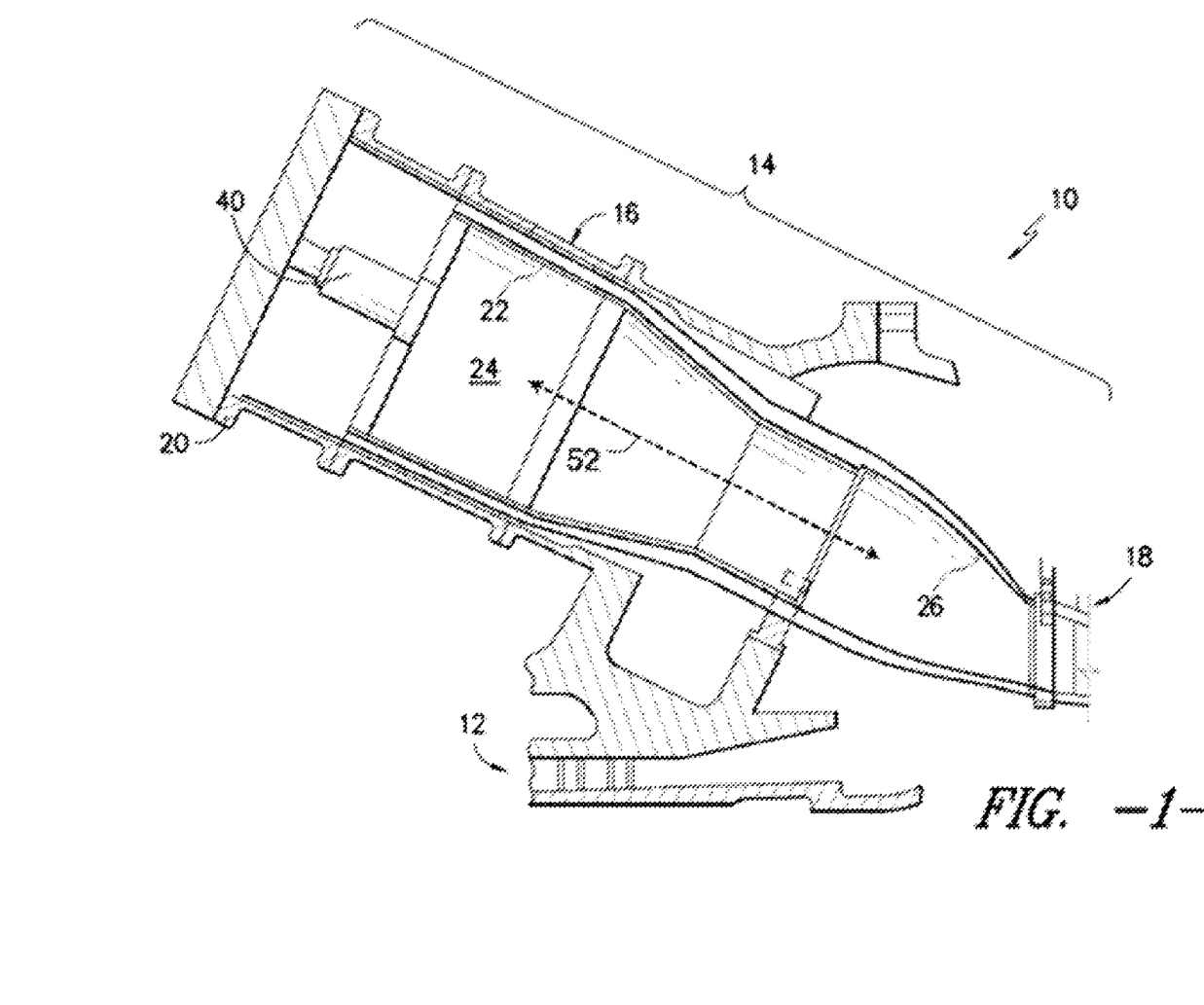
FIG. 1 is a cross-sectional view of several portions of a gas turbine system according to one embodiment of the present disclosure.

Referring to FIG. 1, a simplified drawing of several portions of one embodiment of a gas turbine system 10 is illustrated. It should be understood that the turbine system 10 of the present disclosure need not be a gas turbine system 10, but rather may be any suitable turbine system 10, such as a steam turbine system or other suitable system.

The gas turbine system 10 as shown in FIG. 1 comprises a compressor section 12 for pressurizing a working fluid, discussed below, that is flowing through the system 10. Pressurized working fluid discharged from the compressor section 12 flows into a combustor section 14, which is generally characterized by a plurality of combustors 16 (only one of which is illustrated in FIG. 1) disposed in an annular array about an axis of the system 10. The working fluid entering the combustor section 14 is mixed with fuel, such as natural gas or another suitable liquid or gas, and combusted. Hot gases of combustion flow from each combustor 16 to a turbine section 18 to drive the system 10 and generate power.

The combustor 16 in the gas turbine 10 may include a variety of components for mixing and combusting the working fluid and fuel. For example, the combustor 16 may include a casing 20, such as a compressor discharge casing 20. A variety of sleeves, which may be axially extending annular sleeves, may be at least partially disposed in the casing 20. The sleeves, as shown in FIG. 1, extend axially along a generally longitudinal axis 90, such that the inlet of a sleeve is longitudinally offset and axially aligned with the outlet. For example, a combustor liner 22 may generally define a combustion zone 24 therein. Combustion of the working fluid, fuel, and optional oxidizer may generally occur in the combustion zone 24. The resulting hot gases of combustion may flow generally axially along the longitudinal axis 52 downstream through the combustion liner 22 into a transition duct 26, and then flow generally axially along the longitudinal axis 90 through the transition piece 26 and into the turbine section 18. Alternatively, the combustion liner 22 may be eliminated, and the hot gases of combustion may flow directly through an elongated transition duct 26 into the turbine section 18.

The combustor 16 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion. The transition ducts may generally extend between the fuel nozzles 40 and the turbine section 18.

In alternative exemplary embodiments, as shown in FIGS. 2, 3, 7, and 8, a combustor 16 according to the present disclosure may include a transition duct 50 extending between the fuel nozzle 40 or fuel nozzles 40 and the turbine section 18. The transition ducts 50 of the present disclosure may be provided in place of various axially extending sleeves or transition ducts. For example, a transition duct 50 may replace the axially extending combustor liner 22 and transition piece 26 as shown in FIG. 1 and, as discussed below, may provide various advantages over the axially extending combustor liners 22 and transition ducts 26 for flowing working fluid therethrough and to the turbine section 18.

Figure 2:
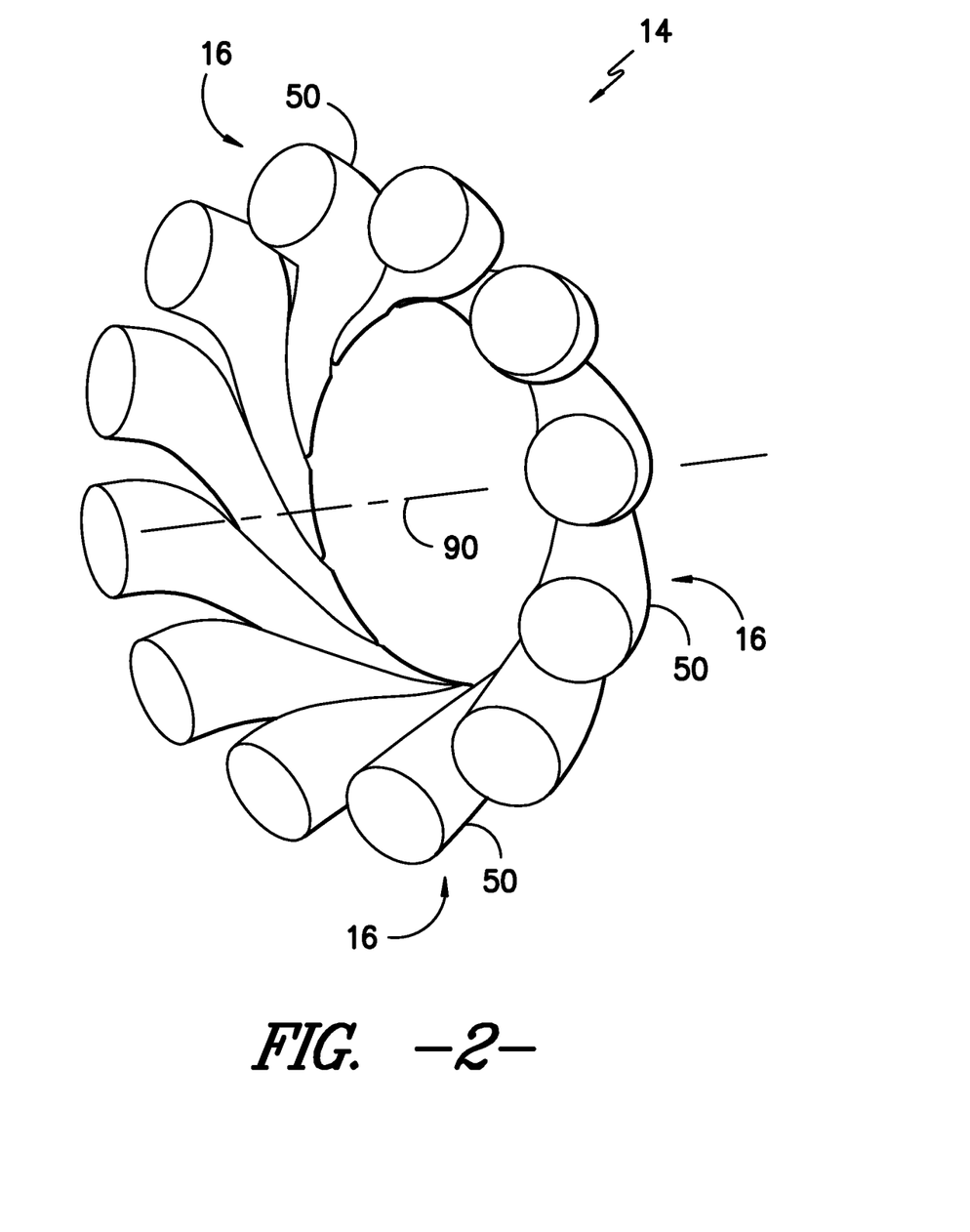
FIG. 2 is a perspective view of an annular array of transition ducts according to one embodiment of the present disclosure.

As shown, the plurality of transition ducts 50 may be disposed in an annular array about longitudinal axis 90. Further, each transition duct 50 may extend between a fuel nozzle 40 or plurality of fuel nozzles 40 and the turbine section 18. For example, each transition duct 50 may extend from the fuel nozzles 40 to the transition section 18. Thus, working fluid may flow generally from the fuel nozzles 40 through the transition duct 50 to the turbine section 18. In some embodiments, the transition ducts 50 may advantageously allow for the elimination of the first stage nozzles in the turbine section, which may eliminate any associated drag and pressure drop and increase the efficiency and output of the system 10.

Each transition duct 50 may have an inlet 52, an outlet 54, and a passage 56 therebetween. The inlet 52 and outlet 54 of a transition duct 50 may have generally circular or oval cross-sections, rectangular cross-sections, triangular cross- sections, or any other suitable polygonal cross-sections. Further, it should be understood that the inlet 52 and outlet 54 of a transition duct 50 need not have similarly shaped cross-sections. For example, in one embodiment, the inlet 52 may have a generally circular cross-section, while the outlet 54 may have a generally rectangular cross-section.

Further, the passage 56 may be generally tapered between the inlet 52 and the outlet 54. For example, in an exemplary embodiment, at least a portion of the passage 56 may be generally conically shaped. Additionally or alternatively, however, the passage 56 or any portion thereof may have a generally rectangular cross-section, triangular cross-section, or any other suitable polygonal cross-section. It should be understood that the cross-sectional shape of the passage 56 may change throughout the passage 56 or any portion thereof as the passage 56 tapers from the relatively larger inlet 52 to the relatively smaller outlet 54.

The outlet 54 of each of the plurality of transition ducts 50 may be offset from the inlet 52 of the respective transition duct 50. The term "offset", as used herein, means spaced from along the identified coordinate direction. The outlet 54 of each of the plurality of transition ducts 50 may be longitudinally offset from the inlet 52 of the respective transition duct 50, such as offset along the longitudinal axis 90.

Additionally, in exemplary embodiments, the outlet 54 of each of the plurality of transition ducts 50 may be tangentially offset from the inlet 52 of the respective transition duct 50, such as offset along a tangential axis 92. Because the outlet 54 of each of the plurality of transition ducts 50 is tangentially offset from the inlet 52 of the respective transition duct 50, the transition ducts 50 may advantageously utilize the tangential component of the flow of working fluid through the transition ducts 30 to eliminate the need for first stage nozzles (not shown) in the turbine section 18.

Further, in exemplary embodiments, the outlet 54 of each of the plurality of transition ducts 50 may be radially offset from the inlet 52 of the respective transition duct 50, such as offset along a radial axis 94. Because the outlet 54 of each of the plurality of transition ducts 50 is radially offset from the inlet 52 of the respective transition duct 50, the transition ducts 50 may advantageously utilize the radial component of the flow of working fluid through the transition ducts 30 to further eliminate the need for first stage nozzles (not shown) in the turbine section 18.

It should be understood that the tangential axis 92 and the radial axis 94 are defined individually for each transition duct 50 with respect to the circumference defined by the annular array of transition ducts 50, as shown in FIG. 2, and that the axes 92 and 94 vary for each transition duct 50 about the circumference based on the number of transition ducts 50 disposed in an annular array about the longitudinal axis 90.

Transition ducts 26 and 50 according to the present disclosure must be supported within the combustor section 14 and system 10 in general. Thus, the present disclosure is further directed to a support assembly 100 for a turbine system 10. The support assembly 100 in general may support a transition duct 26 or 50 within the combustor section 14 and system 10 in general, and in exemplary embodiments may allow movement of the transition duct 26 or 50 about at least one axis.

Figure 6:
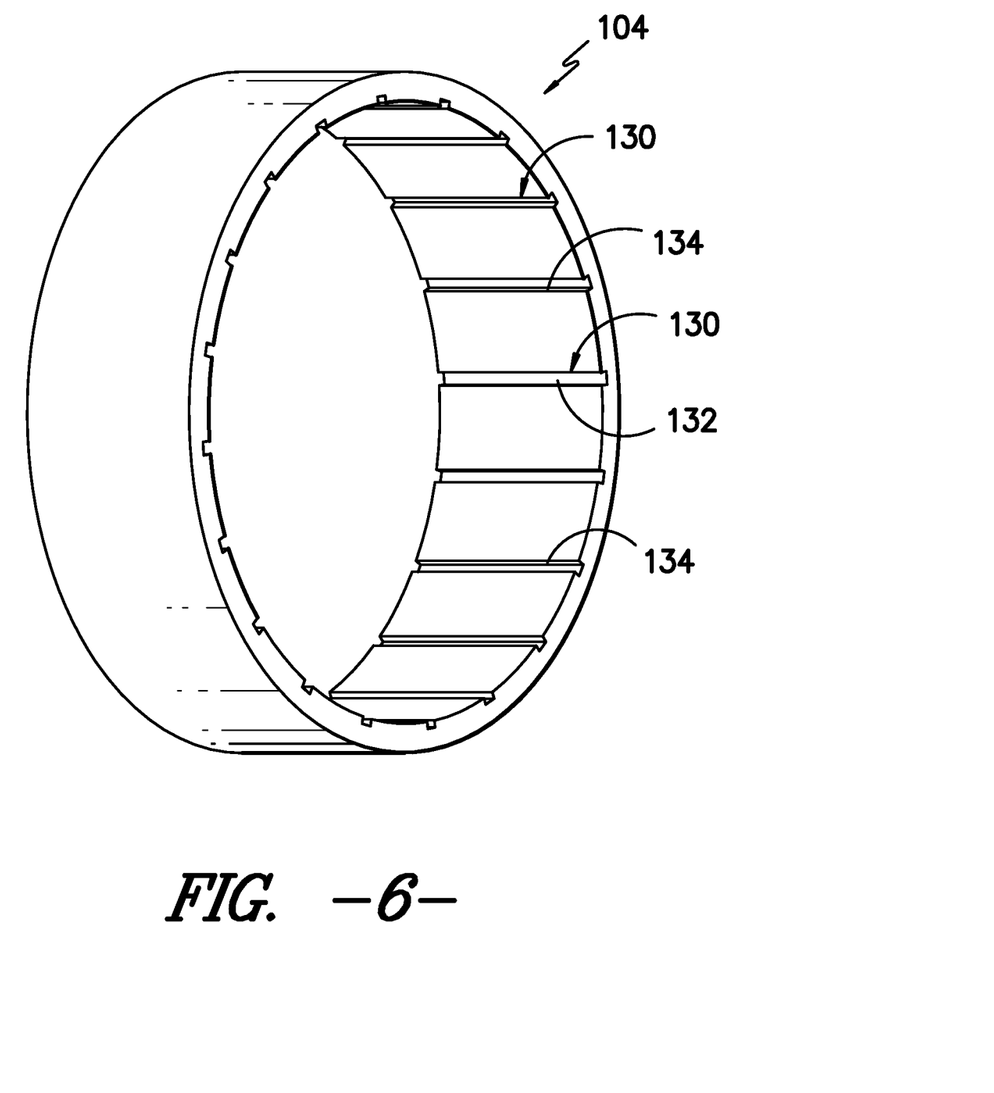
FIG. 6 is a perspective view of a support structure according to one embodiment of the present disclosure.
Figure 7:
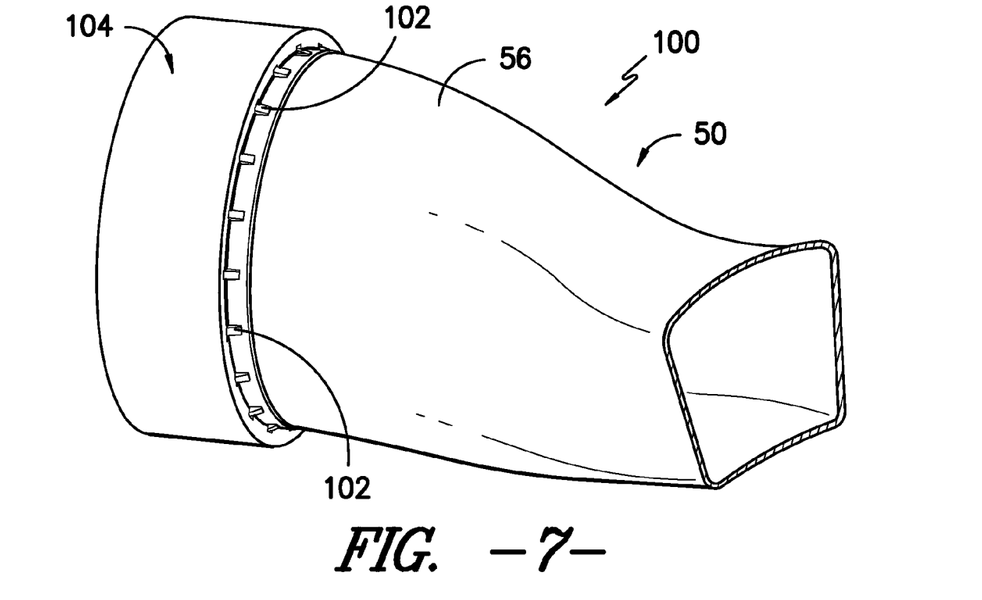
FIG. 7 is a side perspective view of a support assembly including a support structure according to one embodiment of the present disclosure.
Figure 8:
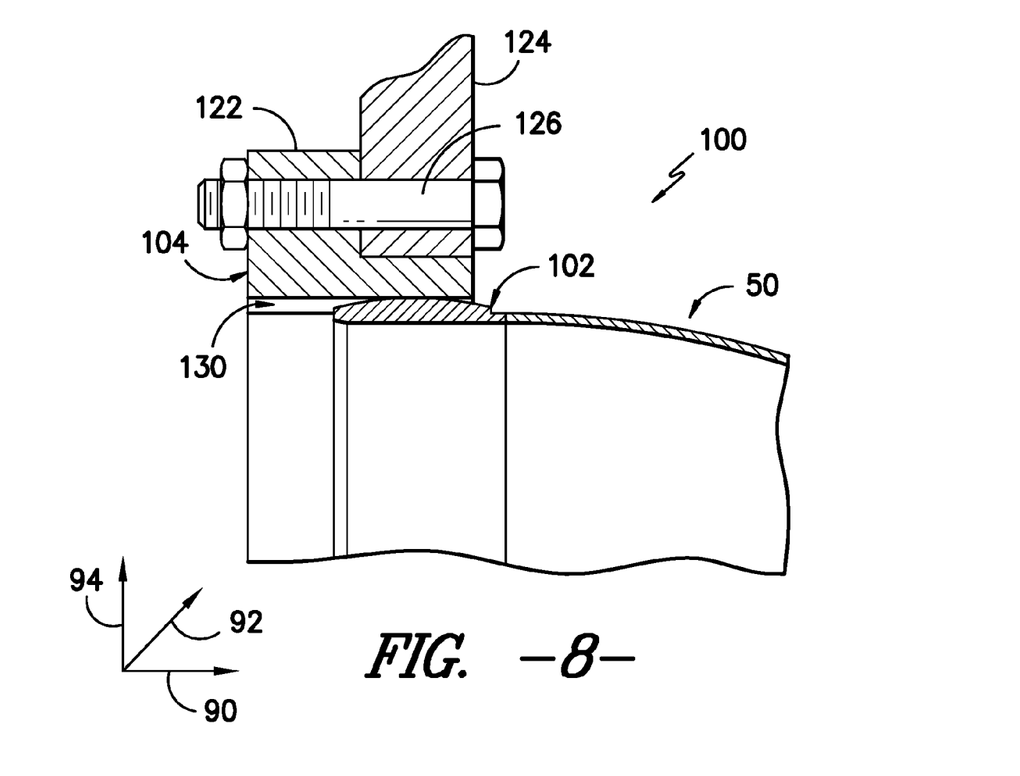
FIG. 8 is a cross-sectional view of a support assembly including a support structure according to one embodiment of the present disclosure.

The support assembly 100 includes a transition duct 26 or 50, as discussed above. Further, as shown in FIGS. 3 through 5, 7, and 8, the support assembly 100 includes a plurality of protrusions 102. The protrusions 102 are configured to allow movement of the transition duct around at least one axis, as discussed below. In further exemplary embodiments, as shown in FIGS. 6 through 8, the support assembly 100 includes a support structure, such as support structure 104. The support structure contacts the protrusions 102, and is configured to locate the transition duct 26 or 50 within the turbine system.

As discussed above, the transition duct in a support assembly 100 may be an axial transition duct 26, as shown in FIG. 1, or an offset transition duct 50, as shown in FIGS. 2, 3, 7, and 8. Thus, while the present disclosure discusses the support assembly 100 within the context of an offset transition duct 50, it should be understood that such disclosure equally applies within the context of an axial transition duct 26.

Figures 3, 4, 5:
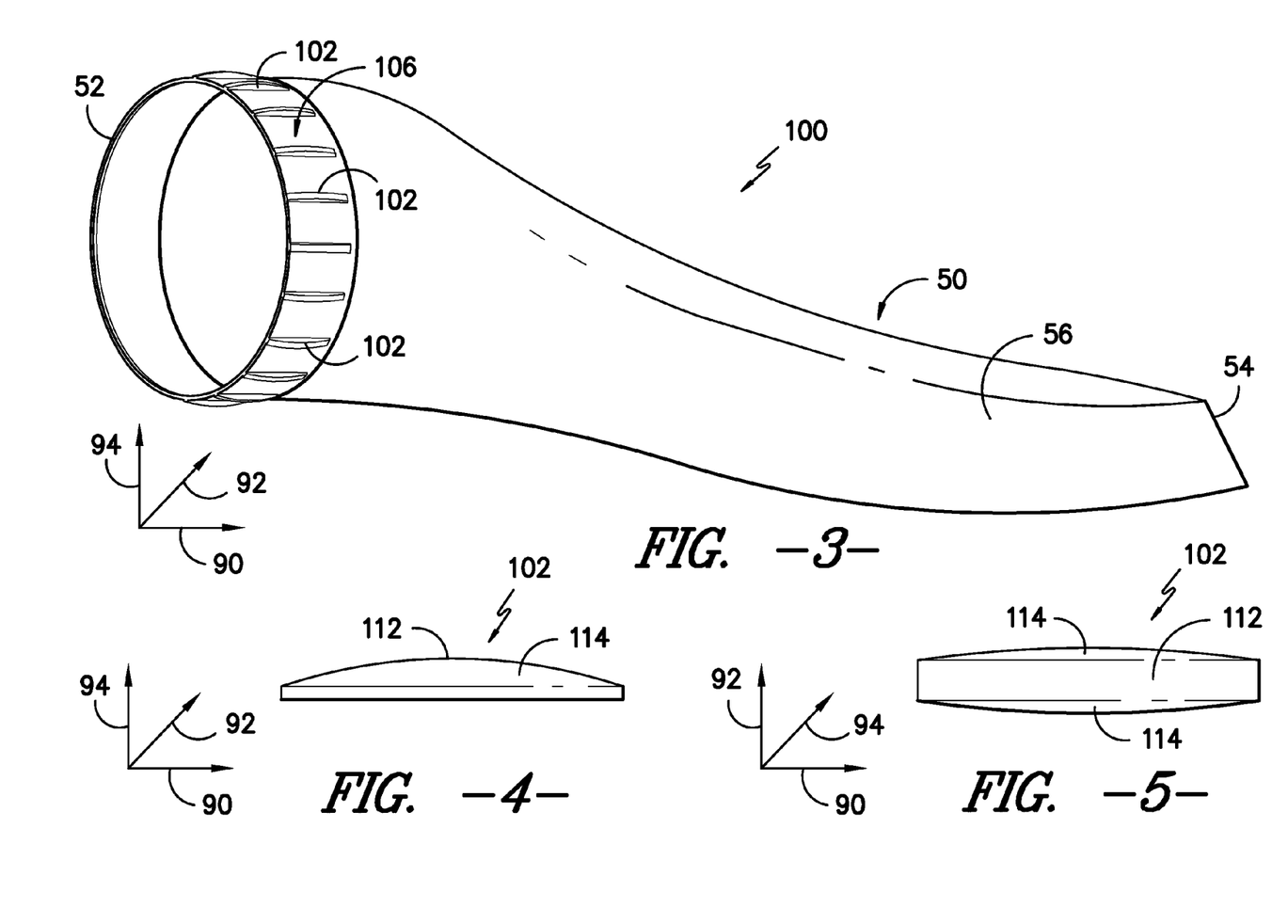
FIG. 3 is a side perspective view of a support assembly according to one embodiment of the present disclosure.
FIG. 4 is a side view of a protrusion according to one embodiment of the present disclosure.
FIG. 5 is a top view of a protrusion according to one embodiment of the present disclosure.

FIG. 3 illustrates one embodiment of a support assembly 100 of the present disclosure. As shown, a plurality of protrusions 102 extend from a transition duct 50. In exemplary embodiments, the protrusions 102 are spaced apart from each other in a generally annular array, such as in a generally annular array about the longitudinal axis 90 as shown. Further, the protrusions 102 in exemplary embodiments extend from a head end 106 of the transition duct 50. The head end 106 of the transition duct 50 is the upstream end of the transition duct 50 with respect to the hot gas flow through the transition duct, and is adjacent to the inlet 52. Notably, the head end 106 may simply be the upstream portion of the transition duct 50 and may be integral with the transition duct 50, or may be a separate component from the transition duct 50 that is mounted to the transition duct 50, through welding or mechanical fastening, for example. Further, it should be understood that the present disclosure is not limited to the above disclosed positioning of the protrusions 102. Rather, protrusions 102 having any suitable positioning relative to each other and/or relative to a transition duct are within the scope and spirit of the present disclosure.

FIGS. 4 and 5 illustrate various embodiments of a protrusion 102 according to the present disclosure. As shown, in exemplary embodiments, each protrusion 102 may have an upper surface 112 and side surfaces 114. The side surfaces 114 extend from the outer surface of the transition duct 50, and the upper surface 112 connects the side surfaces 114. At least one, or a plurality of, the surfaces 112, 114 may be an arcuate surface. For example, FIG. 4 illustrates an arcuate upper surface 112, while FIG. 5 illustrates arcuate side surfaces 114. The arcuate surfaces may extend generally along the longitudinal axis, as shown in FIG. 3. Thus, in exemplary embodiments as shown, the protrusions 102 may be splines. However, it should be understood that the present disclosure is not limited to the above disclosure protrusions shapes. For example, in alternative embodiments, the protrusions 102 may be conical, spherical, cylindrical, cube- or cuboid-like, prism-like, pyramid-like, or have any other suitable shape.

The protrusions 102 may, in exemplary embodiments, be integral with the transition duct 50 and/or the head end 106. Alternatively, the protrusions 102 may be separate components from the transition duct 50 and/or the head end 106, and may be mounted to the transition duct through, for example, welding or suitable mechanical fastening.

The support assembly 100 of the present disclosure may further include a support structure. The support structure generally surrounds and contacts the protrusions 102, and is configured to support and locate the transition duct 50 within the combustor section 14 and system 10 in general. For example, FIGS. 6 through 8 illustrate a support structure 104. The support structure 104 may be a hollow cylinder or ring that accepts the transition duct 50 therein such that the protrusions 102 are in contact with inner surfaces of the support structure 104. Alternatively, however, the support structure 104 may have any suitable shape configured to accept the transition duct 50 therein such that the protrusions 102 are in contact with inner surfaces of the support structure 106.

FIG. 8 is a cross-sectional view of one embodiment of support assembly 100. As shown, support structure 104 is integral with a combustor casing 122. The combustor casing 122 generally surrounds and encases various components of a combustor 16. The combustor casing 122 may be mounted to a compressor discharge casing 124, which may also generally surround and encase various components of a combustor 16. The combustor casing 122 and compressor discharge casing 124 may be mounted together, such as through welding or mechanical fastening. As shown, for example, mechanical fastener 126, which may be a nut-bolt combination, rivet, screw, nail, or other suitable mechanical fastening device, may mount the combustor casing 122 and compressor discharge casing 124 together.

Alternatively, support structure 104 may be integral with compressor discharge casing 124, or may be a separate component mounted to either or both of the combustor casing 122 and the compressor discharge casing 124. Further, it should be understood that the present disclosure is not limited to the above disclosed configurations, and rather that any suitable configuration of a support structure 106, transition duct 26, and protrusions 102 are within the scope and spirit of the present disclosure.

As shown in FIGS. 6 through 8, the support structure 106 may define a plurality of channels 130. The channels 130 may be defined in an inner surface of the support structure 104. Each channel 130 may accept a protrusion 102 therein. As shown, in exemplary embodiments, each channel 130 may have a lower surface 132 and side surface 114. The side surfaces 134 extend inward from a surface of the support structure 106, and the bottom surface 132 connects the side surfaces 134. At least one, or a plurality of, the surfaces 132, 134 may be a linear surface. For example, FIGS. 6 through 8 illustrate a linear bottom surface 132 and linear side surfaces 134. In exemplary embodiments, when the support structure 104 contacts the protrusions 102 such that each protrusion 102 is accepted into a channel 130, the side surfaces 114 contact the side surface 134 and the upper surface 112 contacts the bottom surface 132. However, it should be understood that the present disclosure is not limited to the above disclosure channel shapes. For example, in alternative embodiments, the channels 102 may be conical, spherical, cylindrical, cube- or cuboid-like, prism-like, pyramid-like, or have any other suitable shape.

It should be understood that the present disclosure is not limited to protrusions 102 extending from transition ducts 50 and channels 130 defined in support structures 106. Rather, in alternative embodiments, a plurality of channels 130 may be defined in the transition duct 50, such as the outer surface thereof, while a plurality of protrusions 102 extend from a support structure 106. Operation of such protrusions 102 and/or channels 130 may be in accordance with the various embodiments discussed herein.

As discussed above, the protrusions 102 may be configured to allow movement of the transition duct 50 about at least one axis. Further, in exemplary embodiments, the protrusions 102 may be configured to allow movement of the transition duct 50 about two axes. In some embodiments, the protrusions 102 may allow movement of the transition duct 50 about the tangential axis 92. For example, as discussed above, in exemplary embodiments, the protrusions 102 may have arcuate upper surfaces 112. During operation of the system 10, the transition duct 50 may experience thermal expansion or other various effects that may cause the transition duct 50, such as the head end 106 of the transition duct 50, to move. The arcuate upper surface 112 may allow the transition duct 50 to rotate about the tangential axis 92, thus preventing stresses in the transition duct 50. In some embodiments, the protrusions 102 may allow such rotation of the transition duct 50 about the tangential axis 92 up to a maximum of approximately 5 degrees of rotation, or up to a maximum of 2 degrees of rotation. However, it should be understood that the present disclosure is not limited to the above disclosed degrees of rotation, and rather that any suitable rotation of a transition duct 50 is within the scope and spirit of the present disclosure.

Additionally or alternatively, in some embodiments, the protrusions 102 may allow movement of the transition duct 50 about the radial axis 94. For example, as discussed above, in exemplary embodiments, the protrusions 102 may have arcuate side surfaces 114. During operation of the system 10, the transition duct 50 may experience thermal expansion or other various effects that may cause the transition duct 50, such as the head end 106 of the transition duct 50, to move. The arcuate side surface 114 may allow the transition duct 50 to rotate about the radial axis 94, thus preventing stresses in the transition duct 50. In some embodiments, the protrusions 102 may allow such rotation of the transition duct 50 about the radial axis 94 up to a maximum of approximately 5 degrees of rotation, or up to a maximum of 2 degrees of rotation. However, it should be understood that the present disclosure is not limited to the above disclosed degrees of rotation, and rather that any suitable rotation of a transition duct 50 is within the scope and spirit of the present disclosure.

In exemplary embodiments, the protrusions 102 further allow movement of the transition duct 50 along the longitudinal axis 90. For example, the protrusions 102, while extending from the transition duct 50, are not mounted or attached to any other surface contacting the protrusions 102, such as a surface of the support structure 104. Thus, the protrusions 102 may slide along the longitudinal axis 90 if the transition duct 50 moves along the longitudinal axis 90, such as due to thermal expansion or other various effects that may cause the transition duct 50, such as the head end 106 of the transition duct 50, to move.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A support assembly for a turbine system, the support assembly comprising:
    a transition duct extending between a fuel nozzle and a turbine section, the transition duct having an inlet, an outlet, and a passage extending between the inlet and the outlet and defining a longitudinal axis, a radial axis, and a tangential axis, the outlet of the transition duct offset from the inlet along the longitudinal axis; and
    a plurality of protrusions extending from a head end of the transition duct, the plurality of protrusions configured to allow movement of the transition duct about at least one axis, each of the plurality of protrusions comprising at least one arcuate surface extending from a first end of the protrusion to a second end of the protrusion, the first end proximate the inlet relative to the second end, the second end distal from the inlet relative to the first end.

2. The support assembly of claim 1, wherein the outlet of the transition duct is further offset from the inlet along the tangential axis and the radial axis.

3. The support assembly of claim 1, wherein the plurality of protrusions extend from a head end of the transition duct in a generally annular array.

4. The support assembly of claim 1, wherein the plurality of protrusions are configured to allow movement of the transition duct about two axes.

5. The support assembly of claim 1, wherein the plurality of protrusions are configured to allow movement of the transition duct about the tangential axis.

6. The support assembly of claim 1, wherein the plurality of protrusions are configured to allow movement of the transition duct about the radial axis.

7. The support assembly of claim 1, wherein the at least one arcuate surface extends along the longitudinal axis.

8. The support assembly of claim 1, wherein each of the plurality of protrusions comprises a plurality of arcuate surfaces.

9. The support assembly of claim 1, wherein the at least one arcuate surface is an arcuate upper surface.

10. The support assembly of claim 1, wherein the at least one arcuate surface is an arcuate side surface.

11. The support assembly of claim 1, further comprising a support structure contacting the plurality of protrusions and configured to locate the transition duct within the turbine system.

12. The support assembly of claim 11, wherein the support structure defines a plurality of channels, each channel accepting one of the plurality of protrusions.

13. The support assembly of claim 11, wherein each of the plurality of channels comprises at least one linear surface.

14. A turbine system, comprising:
    a fuel nozzle;
    a turbine section;
    a transition duct extending between the fuel nozzle and the turbine section, the transition duct having an inlet, an outlet, and a passage extending between the inlet and the outlet and defining a longitudinal axis, a radial axis, and a tangential axis, the outlet of the transition duct offset from the inlet along the longitudinal axis; and
    a plurality of protrusions extending from a head end of the transition duct, the plurality of protrusions configured to allow movement of the transition duct about at least one axis, each of the plurality of protrusions comprising at least one arcuate surface extending from a first end of the protrusion to a second end of the protrusion, the first end proximate the inlet relative to the second end, the second end distal from the inlet relative to the first end.

15. The turbine system of claim 14, wherein the outlet of the transition duct is further offset from the inlet along the tangential axis and the radial axis.

16. The turbine system of claim 14, wherein the plurality of protrusions extend from a head end of the transition duct in a generally annular array.

17. The turbine system of claim 14, wherein the plurality of protrusions are configured to allow movement of the transition duct about two axes.

18. The turbine system of claim 14, further comprising a support structure contacting the plurality of protrusions and configured to locate the transition duct within the turbine system.

* * * * *